United States Patent
Kim et al.

(10) Patent No.: US 8,810,274 B2
(45) Date of Patent: *Aug. 19, 2014

(54) ON-DIE TERMINATION CIRCUIT

(71) Applicants: Yong Ju Kim, Icheon-si (KR); Hyung Soo Kim, Hwaseong-si (KR); Hae Rang Choi, Icheon-si (KR); Jae Min Jang, Seoul (KR)

(72) Inventors: Yong Ju Kim, Icheon-si (KR); Hyung Soo Kim, Hwaseong-si (KR); Hae Rang Choi, Icheon-si (KR); Jae Min Jang, Seoul (KR)

(73) Assignee: SK Hynix Inc., Gyeonggi-do (KR)

(*) Notice: Subject to any disclaimer, the term of this patent is extended or adjusted under 35 U.S.C. 154(b) by 18 days.

This patent is subject to a terminal disclaimer.

(21) Appl. No.: 13/657,123

(22) Filed: Oct. 22, 2012

(65) Prior Publication Data

US 2013/0043901 A1 Feb. 21, 2013

Related U.S. Application Data

(63) Continuation of application No. 13/012,972, filed on Jan. 25, 2011, now Pat. No. 8,319,520.

(30) Foreign Application Priority Data

Apr. 1, 2010 (KR) .................. 10-2010-0029939

(51) Int. Cl.
*H03K 17/16* (2006.01)

(52) U.S. Cl.
USPC ................ 326/30; 326/86; 327/108; 327/112

(58) Field of Classification Search
USPC ........ 326/21–27, 30; 327/108–112, 170, 378, 327/379, 389, 391, 427
See application file for complete search history.

(56) References Cited

U.S. PATENT DOCUMENTS

| | | | |
|---|---|---|---|
| 7,525,337 B2* | 4/2009 | Park et al. | 326/30 |
| 8,067,956 B2* | 11/2011 | Lee | 326/30 |
| 2010/0045340 A1* | 2/2010 | Park | 326/30 |
| 2010/0259294 A1* | 10/2010 | Choo et al. | 326/30 |
| 2011/0074463 A1* | 3/2011 | Kao | 326/30 |
| 2011/0242916 A1* | 10/2011 | Seol et al. | 365/198 |

* cited by examiner

*Primary Examiner* — Vibol Tan
(74) *Attorney, Agent, or Firm* — William Park & Associates Patent Ltd.

(57) ABSTRACT

An on-die termination circuit includes a reference period signal generation circuit that generates a reference period signal according to a level of a reference voltage, a first period signal generation circuit that generates a first period signal according to a voltage level of a pad, a period comparison circuit that compares a period of the first period signal with a period of the reference period signal and count a plurality of driving signals, and a driver circuit that drives the pad in response to the plurality of driving signals.

23 Claims, 12 Drawing Sheets

ON-DIE TERMINATION CIRCUIT

CROSS-REFERENCES TO RELATED APPLICATIONS

The present application claims priority under 35 U.S.C 119(a) to Korean application number 10-2010-0029939, filed on Apr. 1, 2010, in the Korean intellectual property Office, which is incorporated herein by reference in its entirety.

BACKGROUND

Semiconductor devices are designed for higher capacity and low power use all the while operating at higher speeds. Particularly, the frequencies of signals transmitted and received for high speed operations have greatly increased. However, increased signal frequencies lead to reduced noise tolerance and unwanted signal reflection due to impedance mismatching. An impedance matching circuit provided in a semiconductor device is known as an on-die termination circuit.

Figure 1:
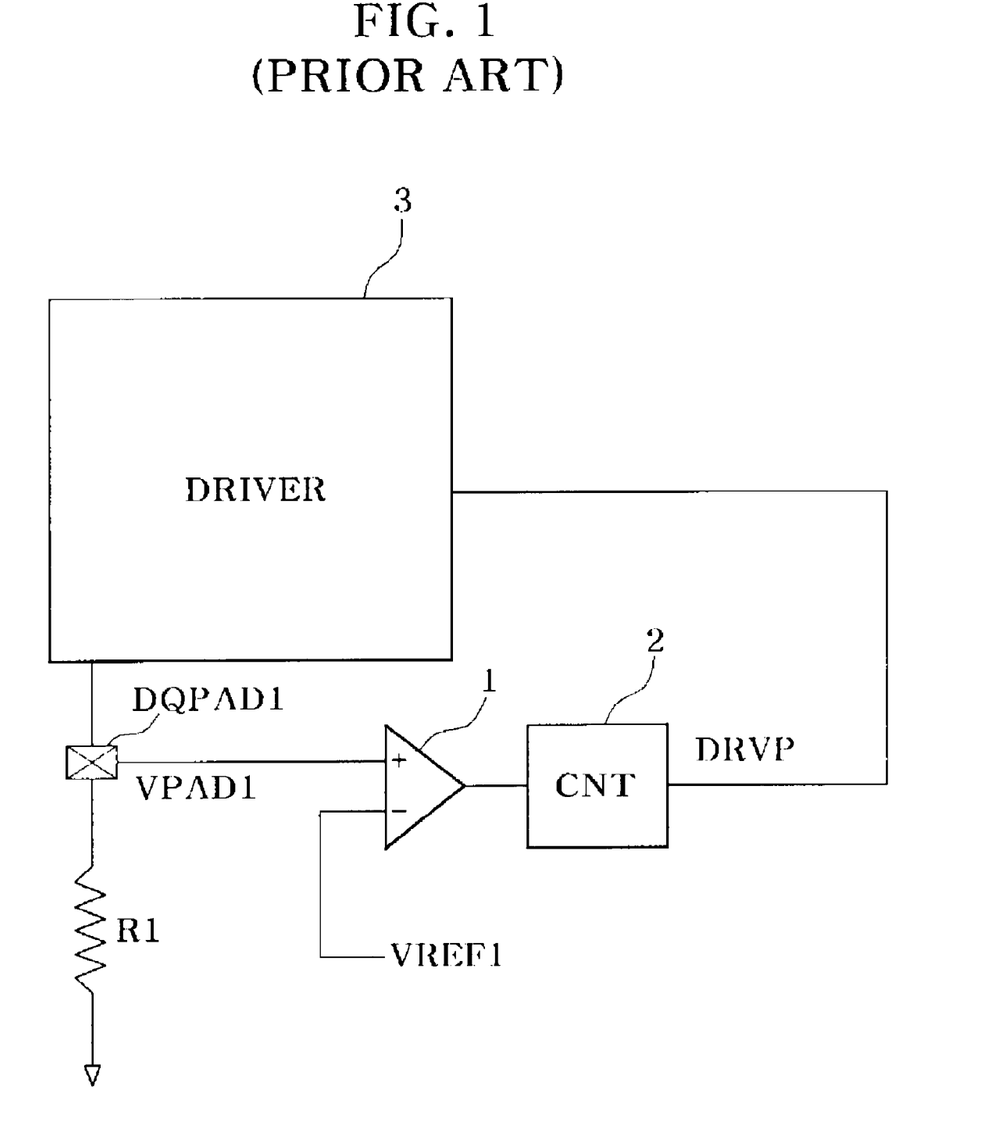
FIG. 1 is a block diagram illustrating an on-die termination circuit according to the related art.

FIG. 1 shows a conventional on-die termination circuit.

As shown in FIG. 1, the conventional on-die termination circuit includes a pad DQPAD1, an external resistor R1, a comparator 1, a counter 2, and a driver 3.

The pad DQPAD1 serves as a data input/output pad through which data is inputted and outputted. The external resistor R1 is coupled to one side of the pad DQPAD1.

Figure 2:
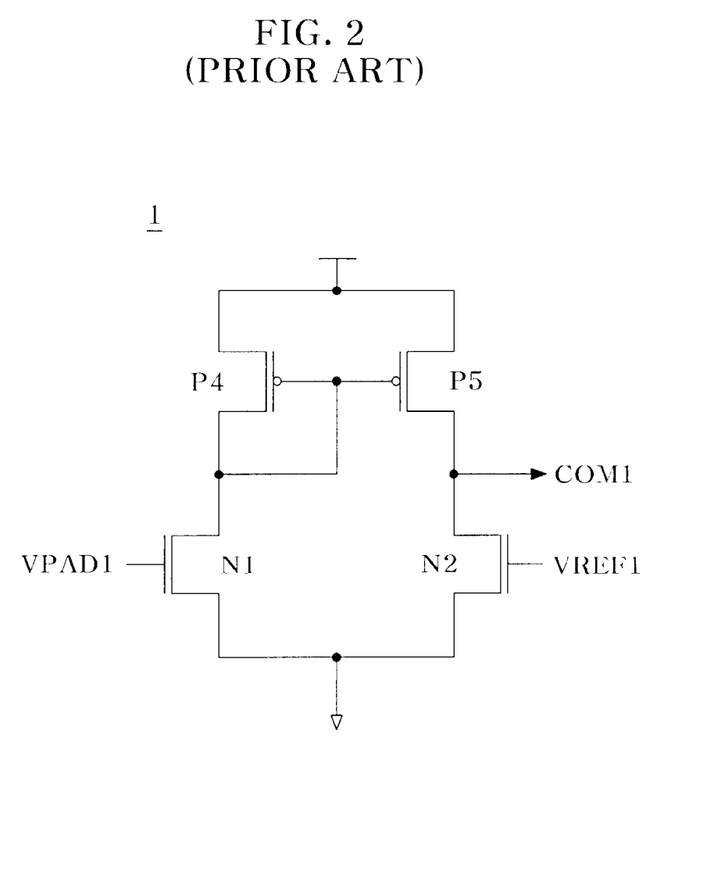
FIG. 2 is a circuit diagram illustrating a comparator of an on-die termination circuit shown in FIG. 1.

The comparator 1 compares the pad voltage VPAD1 with the reference voltage VREF1 to generate a comparison signal COM1. For example, when the pad voltage VPAD1 is higher than the reference voltage VREF1, the comparator 1 outputs a high-level comparison signal COM1. When the pad voltage VPAD1 is lower than the reference voltage VREF1, the comparator 1 outputs a low-level comparison signal COM1. The reference voltage VREF1 corresponds to a level of the pad voltage VPAD1 measured when a resistance value of the external resistor R1 is substantially equal to the resistance value of the driver 3. As shown in FIG. 2, the comparator 1 includes a differential amplifier which includes two NMOS transistors N1, N2 and two PMOS transistors P4, P5, wherein each of the NMOS transistors N1, N2 receive a pad voltage VPAD1 and a reference voltage VREF1, and the PMOS transistors P4, P5 operate as a constant current source.

The counter 2 outputs a 3-bit driving signals DRVP in response to the comparison signal COM1. That is, when the comparison signal COM1 is at a high level, the counter 2 up-counts the driving signals DRVP by one bit to increase bit values of the driving signals DRVP. However, when the comparison signal COM1 is at a low level, the counter 2 down-counts the driving signals DRVP by one bit to reduce the bit values of the driving signals DRVP. The counter 2 includes a general 3-bit counter circuit.

The driver 3 drives the pad DQPAD1 in response to the 3-bit driving signals DRVP.

Such a conventional on-die termination circuit as above compares the level of the pad voltage VPAD1 with the level of the reference voltage VREF1 by using the comparator 1, changes the resistance value of the driver 3 according to the comparison result, and allows the resistance value of the external resistor R1 to be substantially equal to the resistance value of the driver 3.

Among the transistors N1, N2, P4, P5 in the comparator 1 as shown in FIG. 2, the two PMOS transistors P4, P5 must be manufactured in the same size because they operate as the constant current source. However, due to characteristics of a manufacturing process, for example, a difference in the distribution of etching plasma, a difference in the distribution of source power (power applied to pull the etching plasma in the wafer direction) and the like, since the two PMOS transistors P4, P5 are not manufactured in the same size, they may not operate as the constant current source.

Therefore, the comparator 1 generates an offset voltage at a predetermined level even after the impedance matching operation is completed. That is, when the level of the pad voltage VPAD1 is substantially equal to the level of the reference voltage VREF1, the offset voltage of the comparator 1 may be zero. However, when the sizes of the two PMOS transistors P4, P5 are different from each other, the offset voltage of the comparator 1 has a predetermined level other than zero even if the levels of the pad voltage VPAD1 and the reference voltage VREF1 are substantially equal to each other.

Thus, even after the impedance matching operation is completed, the comparator 1 generates the high or low-comparison signal COM1 in order to operate the counter 2, so that the resistance value of the driver 3 is changed by the counter 2. As a result, since the resistance values of the driver 3 and the external resistors R1 are different from each other, signal reflection may not be reduced.

SUMMARY

An embodiment of the present invention relates to an on-die termination circuit for reducing impedance mismatching due to an abnormal operation of a comparator.

In an embodiment of the present invention, an on-die termination circuit includes: a reference period signal generator configured to generate a reference period signal according to a level of a reference voltage; a first period signal generator configured to generate a first period signal according to a voltage level of a pad; a period comparator configured to compare a period of the first period signal with a period of the reference period signal and count a plurality of driving signals; and a driver configured to drive the pad in response to the plurality of driving signals.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 3:
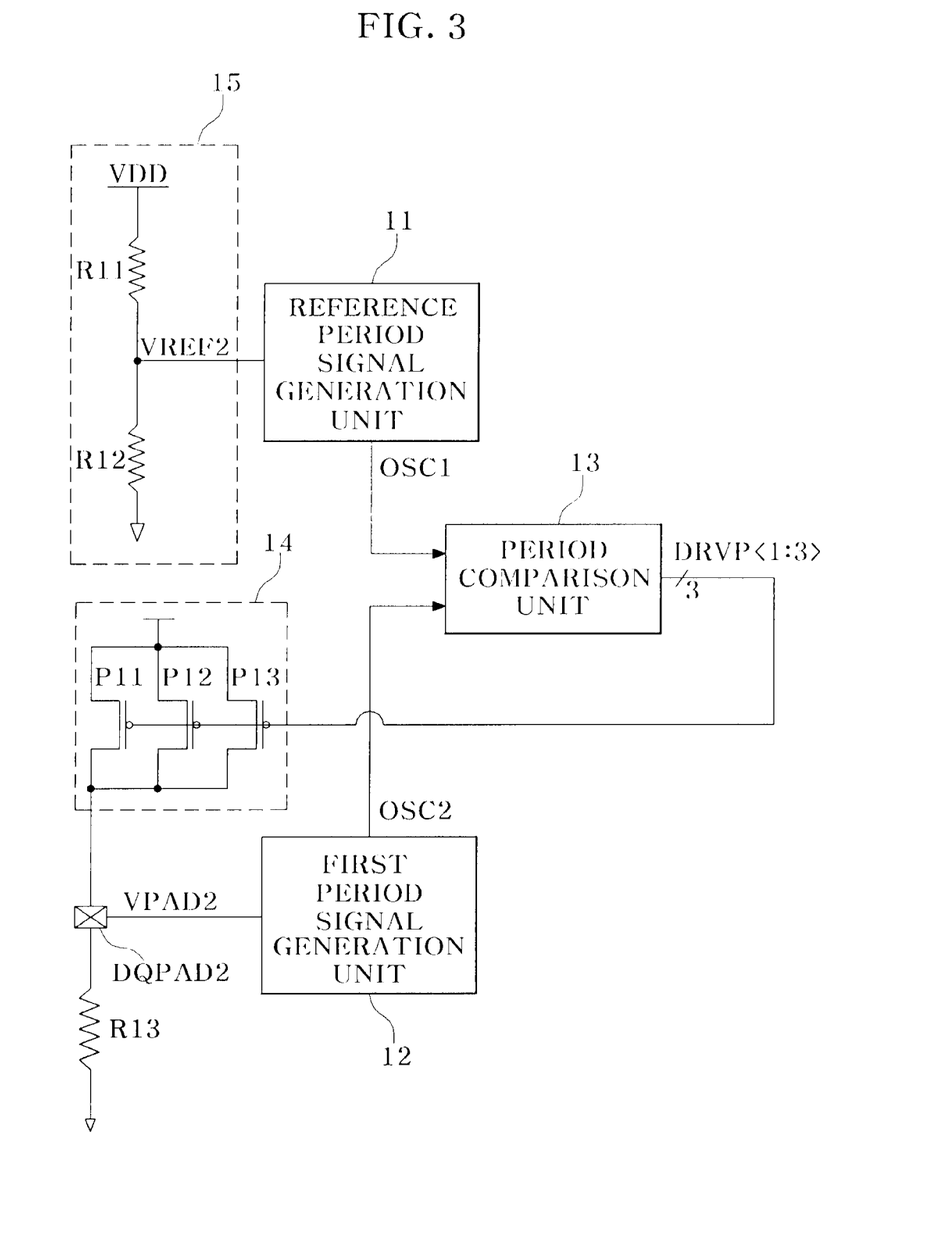
FIG. 3 is a block diagram illustrating an on-die termination circuit according to an embodiment of the present invention.

FIG. 3 is a block diagram illustrating an on-die termination circuit according to an embodiment of the present invention.

As shown in FIG. 3, the on-die termination circuit includes a reference period signal generation circuit 11, a first period signal generation circuit 12, a period comparison circuit 13, a driver circuit 14, a reference voltage generation circuit 15, and an external resistor R13.

Figure 4:
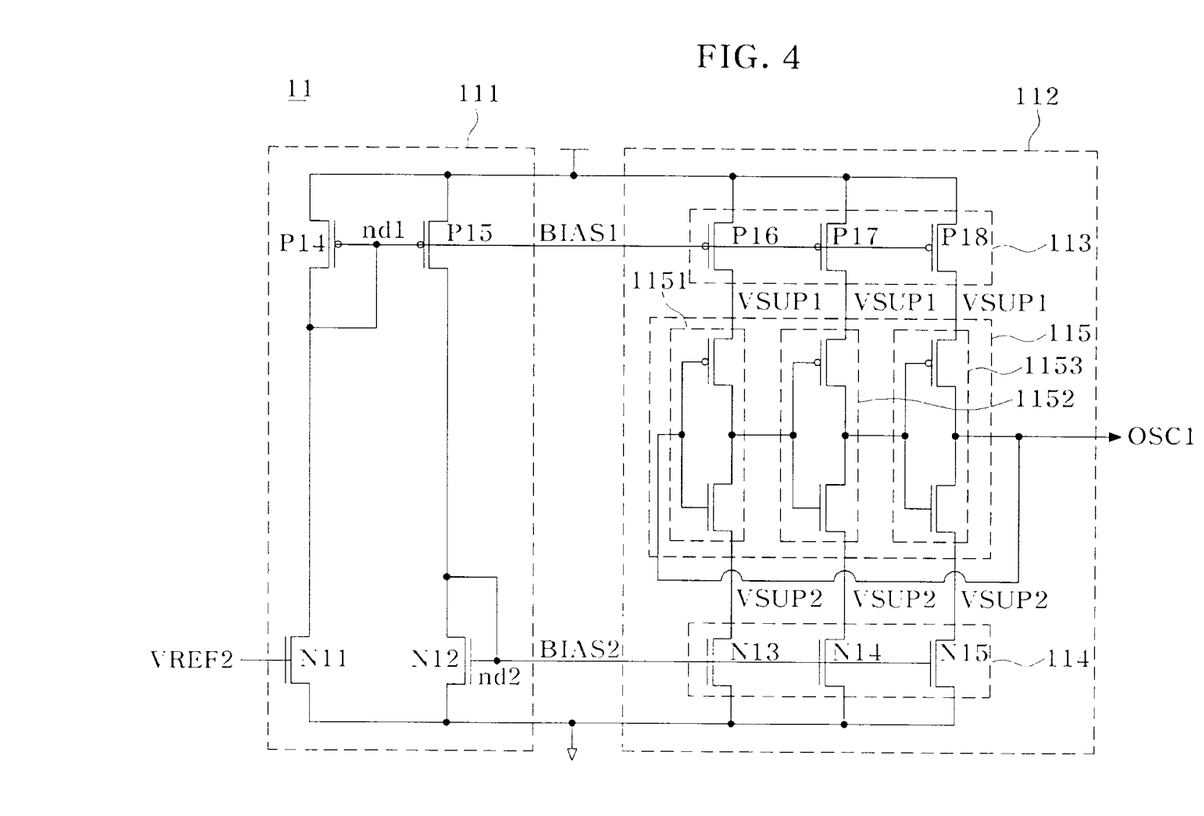
FIG. 4 is a circuit diagram illustrating a reference period signal generation circuit shown in FIG. 3.

As shown in FIG. 4, the reference period signal generation circuit 11 includes a first bias signal generation block 111 and a first oscillation block 112.

The first bias signal generation block 111 includes a first NMOS transistor N11 and a first PMOS transistor P15, wherein the first NMOS transistor N11 operates as a pull-down unit for pull-down driving a first node nd1 in response to a reference voltage VREF2 and generates a first bias signal BIAS1, and the first PMOS transistor P15 operates as a pull-up unit for pull-up driving a second node nd2 in response to the first bias signal BIAS1 and generates a second bias signal BIAS2. The first bias signal generation block 111 further includes a second PMOS transistor P14 and a second NMOS transistor N12, wherein the second PMOS transistor P14 arranged between the first NMOS transistor N11 and a supply voltage (a pull-up voltage) to receive the first bias signal BIAS1 through a gate thereof, and the second NMOS transistor N12 arranged between the first PMOS transistor P15 and a ground voltage (a pull-down voltage) to receive a second bias signal BIAS2 through a gate thereof. The first bias signal generation block 111 having such a configuration determines and outputs the levels of the first bias signal BIAS1 and the second bias signal BIAS2 according to the level of the reference voltage VREF2. For example, when the level of the reference voltage VREF2 is low, the level of the first bias signal BIAS1 is increased since the driving force of the first NMOS transistor N11 driving the first node nd1 is reduced. Therefore, the driving force of the first PMOS transistor P15 driving a second node nd2 is reduced, resulting in the reduction of the level of the second bias signal BIAS2. However, when the level of the reference voltage VREF2 is high, the level of the first bias signal BIAS1 is reduced since the driving force of the first NMOS transistor N11 driving the first node nd1 is increased. Therefore, the driving force of the first PMOS transistor P15 driving the second node nd2 is increased, resulting in the increase of the level of the second bias signal BIAS2.

The first oscillation block 112 includes a first power supply 113, a second power supply 114 and a first inverter chain 115.

The first power supply 113 includes third to fifth PMOS transistors P16, P17, P18 that receive the first bias signal BIAS1 through the gates thereof to generate a first driving voltage VSUP1. The first power supply 113 having such a configuration supplies the first driving voltage VSUP1 to the first inverter chain 115 according to the level of the first bias signal BIAS1.

The second power supply 114 includes third to fifth NMOS transistors N13, N14, N15 that receive the second bias signal BIAS2 through the gates thereof to generate a second driving voltage VSUP2. The second power supply 114 having such a configuration supplies the second driving voltage VSUP2 to the first inverter chain 115 according to the level of the second bias signal BIAS2.

The first inverter chain 115 includes first to third inverters 1151, 1152, 1153 that are serially coupled to each other and driven in response to the first driving voltage VSUP1 and the second driving voltage VSUP2. In detail, the first inverter chain 115 includes the first inverter 1151, which inverts a reference period signal OSC1, the second inverter 1152, which inverts output of the first inverter 1151, and the third inverter 1153 which inverts output of the second inverter 1152 to output the reference period signal OSC1. The first inverter chain 115 may include an odd number of inverters. The first inverter chain 115 as shown in FIG. 4 is driven in response to the first driving voltage VSUP1 and the second driving voltage VSUP2 and generates the reference period signal OSC1.

First, the reference period signal generation circuit 11 having as shown in FIG. 4 generates the first bias signal BIAS1 and the second bias signal BIAS2 in response to the level of the reference voltage VREF2. Next, the reference period signal generation circuit 11 determines the levels of the first driving voltage VSUP1 and the second driving voltage VSUP2 in response to the levels of the first bias signal BIAS1 and the second bias signal BIAS2, and outputs the reference period signal OSC1 with a predetermined period in response to the determined levels of the first driving voltage VSUP1 and the second driving voltage VSUP2. At this time, the period of the reference period signal OSC1 is determined by the level of the reference voltage VREF2. For example, when the level of the reference voltage VREF2 is low, the driving force of the first power supply 113 and driving force of the second power supply 114 are also reduced since the driving force of the first bias signal generation block 111 is reduced, and this results in the increase in delay amounts of the first to third inverters 1151, 1152, 1153. As a result, the period of the reference period signal OSC1 is lengthened. However, when the level of the reference voltage VREF2 is high, the driving force of the first power supply 113 and the driving force of the second power supply 114 are also increased since the driving force of the first bias signal generation block 111 is increased, and this results in the reduction in delay amounts of the first to third inverters 1151, 1152, 1153. As a result, the period of the reference period signal OSC1 is shortened.

Figure 5:
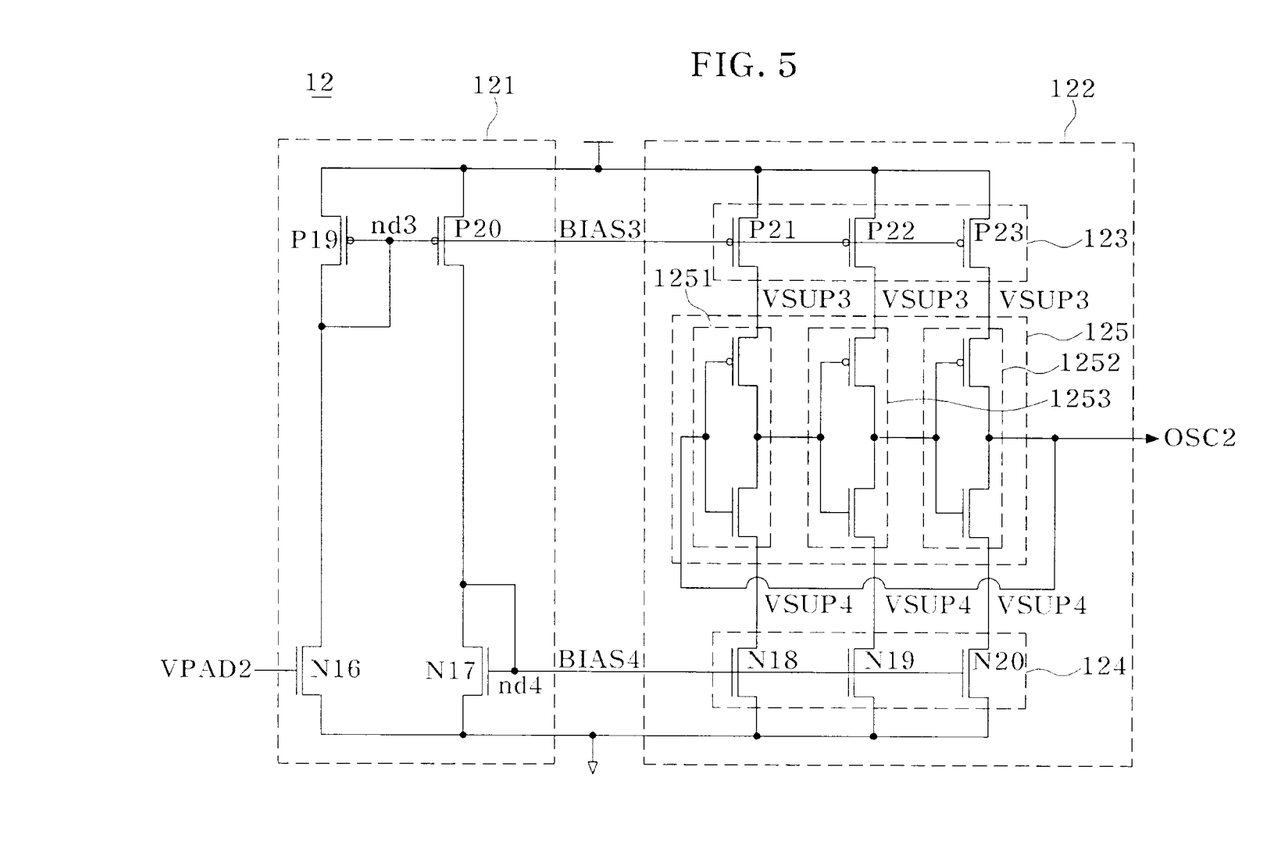
FIG. 5 is a circuit diagram illustrating a first period signal generation circuit shown in FIG. 3.

As shown in FIG. 5, the first period signal generation circuit 12 includes a second bias signal generation block 121 and a second oscillation block 122.

The second bias signal generation block 121 includes a sixth NMOS transistor N16 and a sixth PMOS transistor P20, wherein the sixth NMOS transistor N16 operates as a pull-down unit for pull-down driving a third node nd3 in response to a pad voltage VPAD2 and generates a third bias signal BIAS3, and the sixth PMOS transistor P20 operates as a pull-up unit for pull-up driving a fourth node nd4 in response to the third bias signal BIAS3 and generates a fourth bias signal BIAS4. The second bias signal generation block 121 further includes a seventh PMOS transistor P19 and a seventh NMOS transistor N17, wherein the seventh PMOS transistor P19 arranged between the sixth NMOS transistor N16 and a supply voltage (a pull-up voltage) to receive the third bias signal BIAS3 through a gate thereof, and the seventh NMOS transistor N17 arranged between the sixth PMOS transistor P20 and a ground voltage (a pull-down voltage) to receive a fourth bias signal BIAS4 through a gate thereof. The second bias signal generation block 121 having such a configuration determines and outputs the levels of the third bias signal BIAS3 and the fourth bias signal BIAS4 according to the level of the pad voltage VPAD2. For example, when the level of the pad voltage VPAD2 is low, the level of the third bias signal BIAS3 is increased since the driving force of the sixth NMOS transistor N16 driving the third node nd3 is reduced. Therefore, the driving force of the sixth PMOS transistor P20 driving a fourth node nd4 is reduced, resulting in the reduction of the level of the fourth bias signal BIAS4. However, when the level of the pad voltage VPAD2 is high, the level of the third bias signal BIAS3 is reduced since the driving force of the sixth NMOS transistor N16 driving the fourth node nd4 is increased, the level of the third bias signal BIAS3 is reduced. Therefore, the driving force of sixth PMOS transistor P20 driving the fourth node nd4 is increased, resulting in the increase of the level of the fourth bias signal BIAS4.

The second oscillation block 122 includes a third power supply 123, a fourth power supply 124 and a second inverter chain 125.

The third power supply 123 includes eighth to tenth PMOS transistors P21, P22, P23 that receive the third bias signal BIAS3 through the gates thereof to generate a third driving voltage VSUP3. The third power supply 123 having such a configuration supplies the third driving voltage VSUP3 to the second inverter chain 125 in response to the level of the third bias signal BIAS3.

The fourth power supply 124 includes eighth to tenth NMOS transistors N18, N19, N20 that receive the fourth bias signal BIAS4 through the gates thereof to generate a fourth driving voltage VSUP4. The fourth power supply 124 as shown in FIG. 5 supplies the second driving voltage VSUP2 to the second inverter chain 125 in response to the level of the fourth bias signal BIAS4.

The second inverter chain 125 includes fourth to sixth inverters 1251, 1252, 1253 that are serially coupled to each other and driven in response to the third driving voltage VSUP3 and the fourth driving voltage VSUP4. In detail, the second inverter chain 125 includes the fourth inverter 1251, which inverts a first period signal OSC2, the fifth inverter 1252, which inverts output of the fourth inverter 1251, and the sixth inverter 1253 which inverts output of the fifth inverter 1252 to output the first period signal OSC2. The second inverter chain 125 may include an odd number of inverters. The second inverter chain 125 having as shown in FIG. 5 is driven in response to the third driving voltage VSUP3 and the fourth driving voltage VSUP4 and generates the first period signal OSC2.

The first period signal generation circuit 12 shown in FIG. 5 generates the third bias signal BIAS3 and the fourth bias signal BIAS4 in response to the level of the pad voltage VPAD2. Next, the first period signal generation circuit 12 determines the levels of the third driving voltage VSUP3 and the fourth driving voltage VSUP4 in response to the levels of the third bias signal BIAS3 and the fourth bias signal BIAS4, and outputs the first period signal OSC2 with a predetermined period in response to the determined levels of the third driving voltage VSUP3 and the fourth driving voltage VSUP4. At this time, the period of the first period signal OSC2 is determined by the level of the pad voltage VPAD2. For example, when the level of the pad voltage VPAD2 is low, the driving force of the third power supply 123 and driving force of the fourth power supply 124 are also reduced since the driving force of the second bias signal generation block 121 is reduced, and this results in the increase in delay amounts of the fourth to sixths inverters 1251, 1252, 1253. As a result, the period of the first period signal OSC2 is lengthened. However, when the level of the pad voltage OSC2 is high, the driving force of the third power supply 123 and driving force of the fourth power supply 124 are also increased since the driving force of the second bias signal generation block 121 is increased, and this results in the reduction in the delay amounts of the fourth to sixths inverters 1251, 1252, 1253. As a result, the period of the first period signal OSC2 is shortened.

Figure 6:
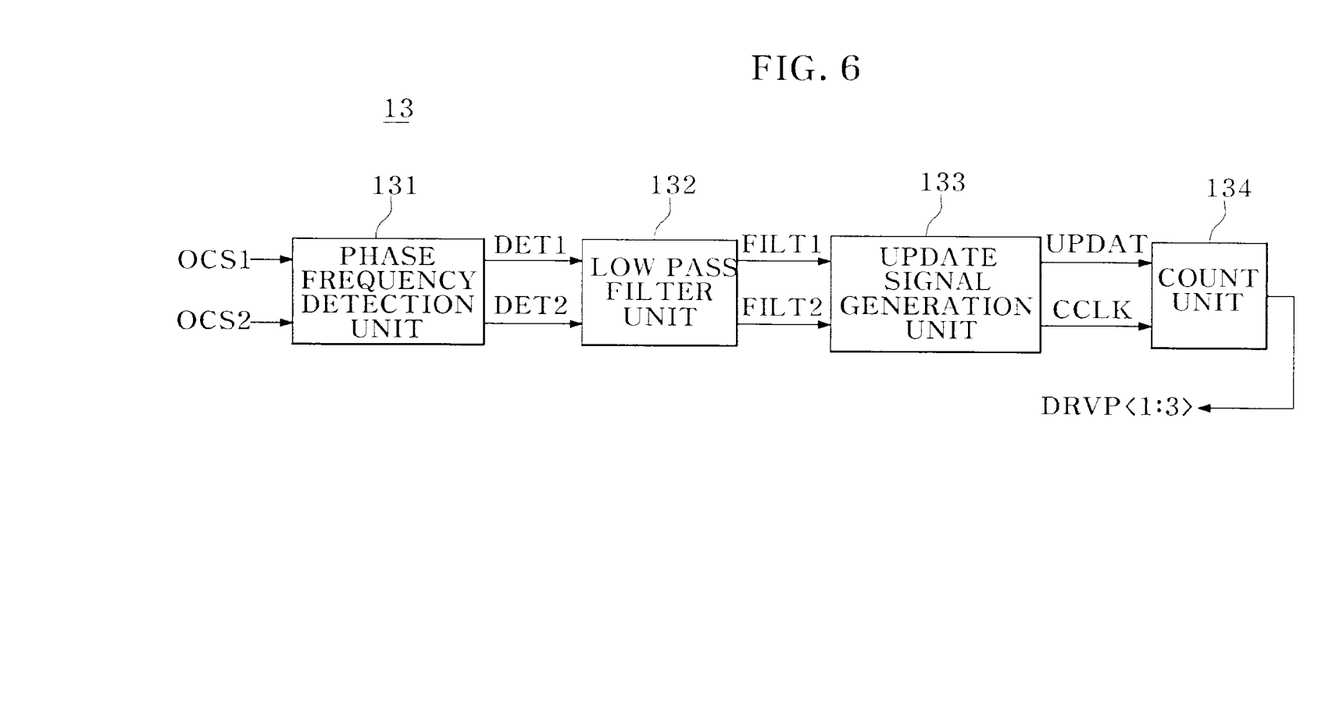
FIG. 6 is a circuit diagram illustrating a period comparison circuit shown in FIG. 3.

As shown in FIG. 6, the period comparison circuit 13 includes a phase frequency detection block 131, a low pass filter block 132, an update signal generation block 133, and a count block 134.

Figure 7:
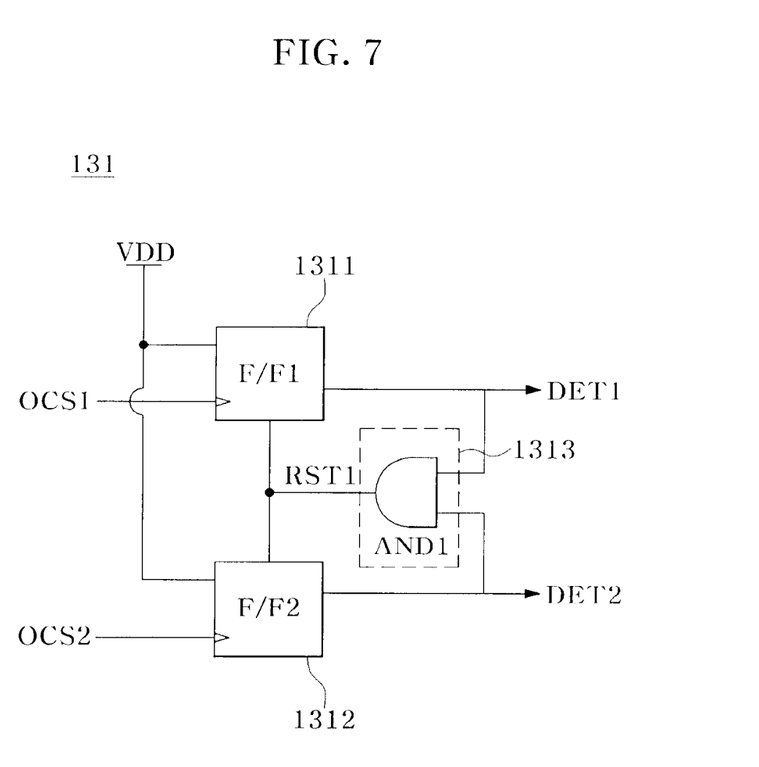
FIG. 7 is a circuit diagram illustrating a phase frequency detection block shown in FIG. 6.

As shown in FIG. 7, the phase frequency detection block 131 includes a first control signal generator 1311, a second control signal generator 1312, and a reset signal generator 1313, wherein the first control signal generator 1311 outputs the supply voltage VDD (pull-up voltage) as a first control signal DET1 in synchronization with the reference period signal OSC1, the second control signal generator 1312 outputs the supply voltage VDD (pull-up voltage) as a second control signal DET2 in synchronization with the first period signal OSC2, and the reset signal generator 1313 generates a reset signal RST1 for resetting the first and second control signal generators 1311, 1312 in response to the first and second control signals DET1, DET2. The first and second control signal generator 1311, 1312 can be prepared in the form of a flip-flop. The reset signal generator 1313 includes an AND gate AND1 that receives the first and second control signals DET1, DET2 as inputs. When the first and second control signals DET1, DET2 are at a high level, the reset signal RST1 is enabled to reset the first and second control signal generators 1311, 1312. The phase frequency detection block 131 as shown in FIG. 7 generates the first control signal DET1 and the second control signal DET2 in response to the periods of the reference period signal OSC1 and the first period signal OSC2. For example, when the period of the first period signal OSC2 is longer than the period of the reference period signal OSC1, the phase frequency detection block 131 generates the first and second control signals DET1, DET2, where a high level duration of DET1 is longer than a low level duration of DET1, and a low level duration of DET2 is longer than a high level duration of DET2. However, when the first period signal OSC2 has a period shorter than that of the reference period signal OSC1, the phase frequency detection block 131 generates the first control signal DET1 with a low level duration longer than a high level duration and the second control signal DET2 with a high level duration longer than a low level duration.

Figure 8:
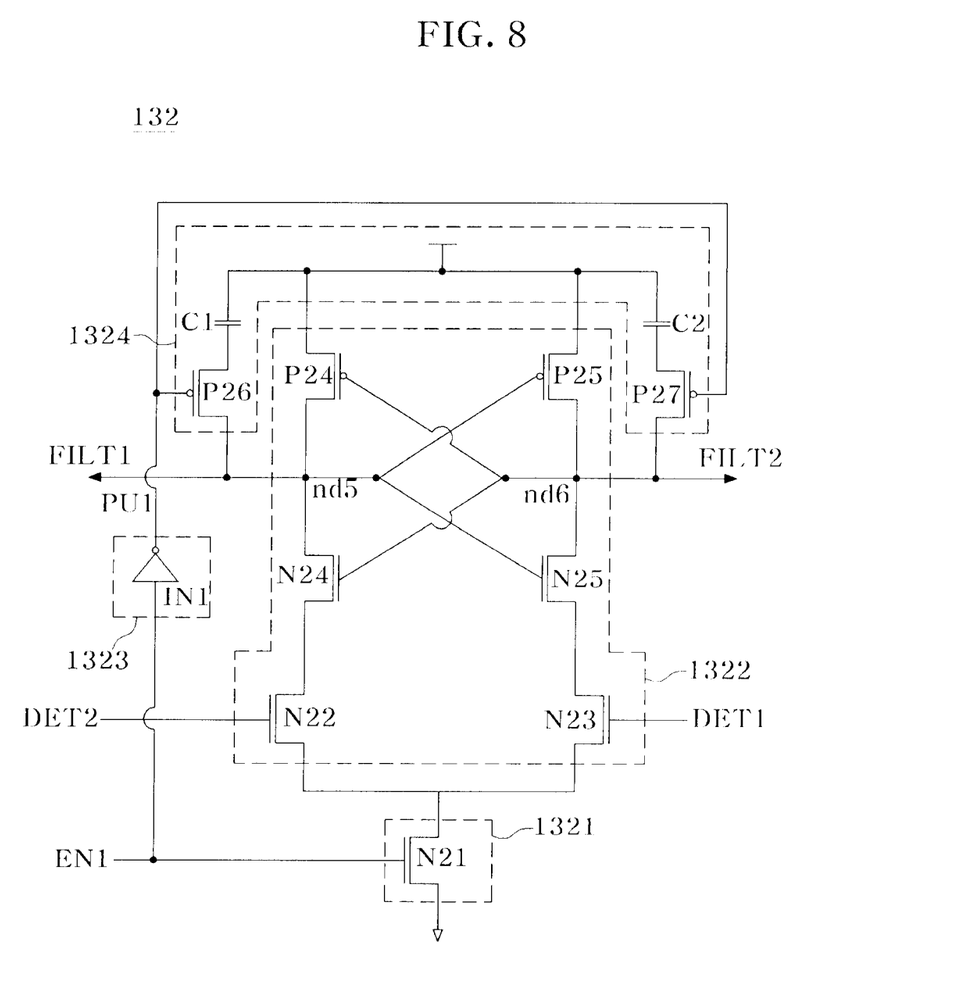
FIG. 8 is a circuit diagram illustrating a low pass filter block shown in FIG. 6.

As shown in FIG. 8, the low pass filter block 132 includes an enable unit 1321, a comparing unit 1322, an inverting unit 1323, and a pull-up driver circuit 1324.

The enable unit 1321 includes an eleventh NMOS transistor N21 that receives an enable signal EN1 through a gate thereof. The enable unit 1321 enables the low pass filter block 132.

The comparing unit 1322 includes the NMOS and PMOS transistors N22, N23, N24, N25, P24, P25. The twelfth and thirteenth NMOS transistors N22, N23 receive the second and first control signals DET2, DET1 through their respective gates. The eleventh PMOS transistor P24 and the fourteenth NMOS transistor N24 receive the signal of a sixth node nd6 through the gates thereof. The twelfth PMOS transistor P25 and a fifteenth NMOS transistor N25 receive a signal of a fifth node nd5 through the gates thereof.

The inverting unit 1323 includes a first inverter IN1 that inverts the enable signal EN1 to output a pull-up enable signal PU1.

The pull-up driver circuit 1324 includes a thirteenth PMOS transistor P26, which pull-up drives the fifth node nd5 in response to the pull-up enable signal PU1, and further includes a first capacitor C1 in order to allow the pull-up voltage to be stably supplied to the thirteenth PMOS transistor P26. Moreover, the pull-up driver circuit 1324 includes a fourteenth PMOS transistor P27, which pull-up drives the sixth node nd6 in response to the pull-up enable signal PU1, and further includes a second capacitor C2 in order to allow the pull-up voltage to be stably supplied to the fourteenth PMOS transistor P27. The low pass filter block 132 is driven when the enable signal EN1 is enabled at a high level and generates the first and second filtering signals FILT1, FILT2 in response to the levels of the first and second control signals DET1, DET2. For example, when the high level duration of the first control signal DET1 is longer than the high level duration of the second control signal DET2, the sixth node nd6 is pull-down driven, so that the second filtering signal FILT2 is changed to a low level. Then, the first filtering signal FILT1 is substantially maintained at a high level by the thirteenth PMOS transistor P26. However, when the high level duration of the second control signal DET2 is longer than the high level duration of the first control signal DET1, the fifth node nd5 is pull-down driven, so that the first filtering signal FILT1 is changed to a low level. Then, the second filtering signal FILT2 is substantially maintained at a high level by the fourteenth PMOS transistor P27.

Figure 9:
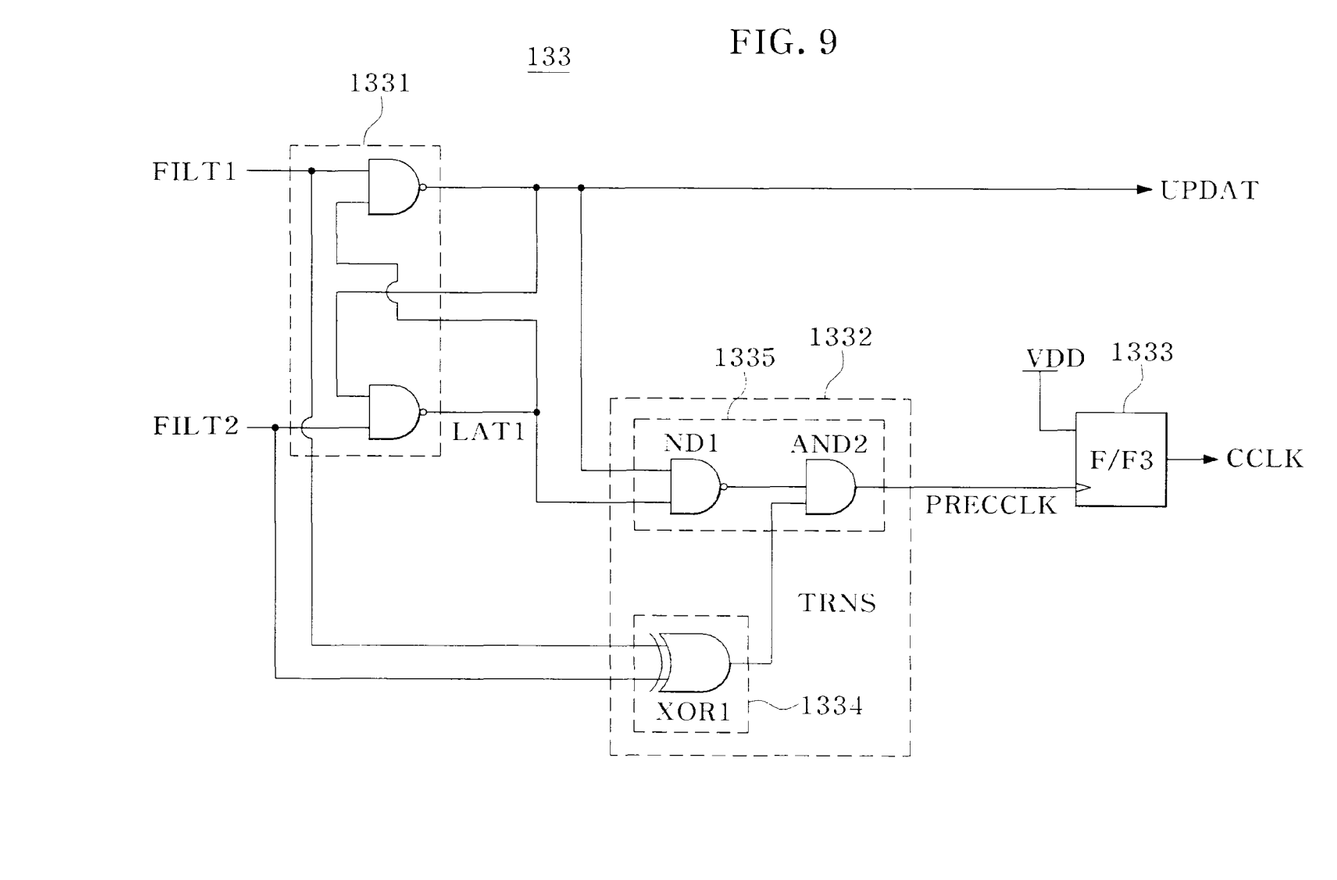
FIG. 9 is a circuit diagram illustrating an update signal generation block shown in FIG. 6.

As shown in FIG. 9, the update signal generation block 133 includes an update signal output unit 1331, a pre-control clock generation unit 1332, and a control clock generation unit 1333.

The update signal output unit 1331 includes an NAND gate latch known as a SR latch that receives the first and second filtering signals FILT1, FILT2 and outputs an update signal UPDAT. When the first filtering signal FILT1 is at a low level and the second filtering signal FILT2 is at a high level, the update signal output unit 1331 changes the update signal UPDAT to a high level. However, when the first filtering signal FILT1 is at a high level and the second filtering signal FILT2 is at a low level, the update signal output unit 1331 changes the update signal UPDAT to a low level.

The pre-control clock generation unit 1332 includes a transmission signal output section 1334 and a pre-control clock output section 1335. In detail, when the levels of the first and second filtering signals FILT1, FILT2 are different from each other, the transmission signal output section 1334 enables a transmission signal TRNS to a high level and outputs the high-level transmission signal TRNS. The pre-control clock output section 1335 outputs a pre-control clock PRECCLK in response to the level of the transmission signal TRNS, the update signal UPDAT and a first latch output signal LAT1. The transmission signal output section 1334 includes a first exclusive OR gate XOR1 that outputs a transmission signal XOR1 by performing an XOR operation on the first and second filtering signals FILT1, FILT2. The transmission signal output section 1334 in FIG. 9 outputs the high-level transmission signal TRNS when the first filtering signal FILT1 is at a high level and the second filtering signal FILT2 is at a low level or when the first filtering signal FILT1 is at a low level and the second filtering signal FILT2 is at a high level. The pre-control clock output section 1335 includes a first NAND gate ND1 and a second AND gate ND2. The first NAND gate ND1 performs a NAND operation on the update signal UPDAT and the first latch output signal LAT1, and the second AND gate ND2 outputs the pre-control clock PRECCLK by performing an AND operation on the transmission signal TRNS and the output of the first NAND gate ND1.

When the levels of the first and second filtering signals FILT1, FILT2 are different from each other, the pre-control clock generation unit 1332 having such a configuration generates the pre-control clock PRECCLK enabled according to the difference between the levels thereof. For example, when the first filtering signal FILT1 is substantially maintained at a high level and the second filtering signal FILT2 is changed from a high level to a low level, the pre-control clock PRECCLK is changed to a high level for output at the time point at which the second filtering signal FILT2 is changed to the low level. Furthermore, when the first filtering signal FILT1 is changed from a high level to a low level and the second filtering signal FILT2 is substantially maintained at a high level, the pre-control clock PRECCLK is changed to a high level for output at the time point at which the first filtering signal FILT1 is changed to the low level.

The control clock generation unit 1333 includes a flip-flop that outputs the supply voltage VDD (pull-up voltage) as a control clock CCLK in synchronization with the pre-control clock PRECCLK.

Figure 10:
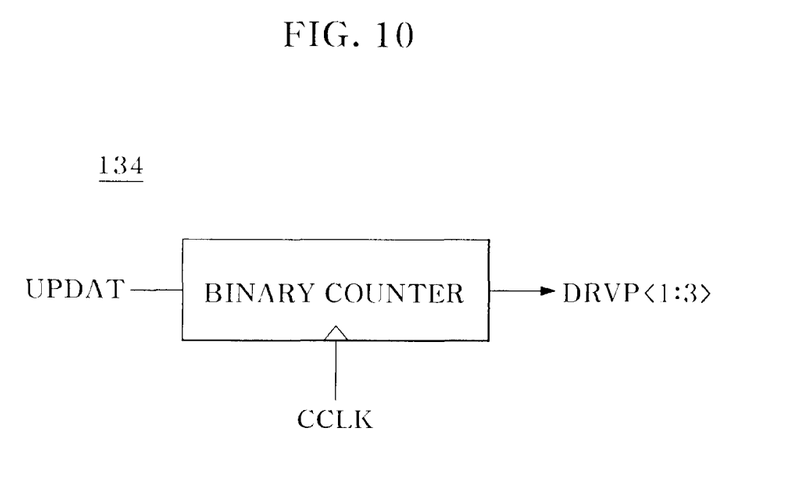
FIG. 10 is a circuit diagram illustrating a count block shown in FIG. 6.

As shown in FIG. 10, the count block 134 includes a binary counter. The count block 134 outputs the 3-bit driving signals DRVP<1:3> by sequentially up or down-counting the 3-bit driving signals DRVP<1:3> by one bit in response to the update signal UPDAT in the high level duration of the control clock CCLK. That is, when the update signal UPDAT is at a high level in the high level duration of the control clock CCLK, the count block 134 up-counts the driving signals DRVP<1:3> by one bit to increase the bit values of the driving signals DRVP<1:3>. However, when the update signal UPDAT is at a low level in the high level duration of the control clock CCLK, the count block 134 down-counts the driving signals DRVP<1:3> by one bit to reduce the bit values of the driving signals DRVP<1:3>.

Referring back to FIG. 3, the driver circuit 14 includes: a fifteenth PMOS transistor P11, which operates as a pull-up unit for pull-up driving the pad DQPAD2 in response to the first driving signal DRVP<1>; a sixteenth PMOS transistor P12, which operates as a pull-up unit for pull-up driving the pad DQPAD2 in response to the second driving signal DRVP<2>; and a seventeenth PMOS transistor P13, which operates as a pull-up unit for pull-up driving the pad DQPAD2 in response to the third driving signal DRVP<3>. The fifteenth to seventeenth PMOS transistors P11, P12, P13 change the pad voltage VPAD2 by driving the pad DQPAD2 in response to the first driving signal DRVP<1>, the second driving signal DRVP<2> and the third driving signal DRVP<3>.

The reference voltage generation circuit 15 includes first and second resistor R11, R12 for distributing the supply voltage VDD (pull-up voltage). The reference voltage generation circuit 15 having such a configuration distributes the supply voltage VDD to generate the reference voltage VREF2.

Hereinafter, the operation of the on-die termination circuit according to an embodiment of the present invention as described above will be described in the case when the first driving signal DRVP<1> is at a high level and the second and third driving signals DRVP<2>, DRVP<3> are at a low level.

Figure 11:
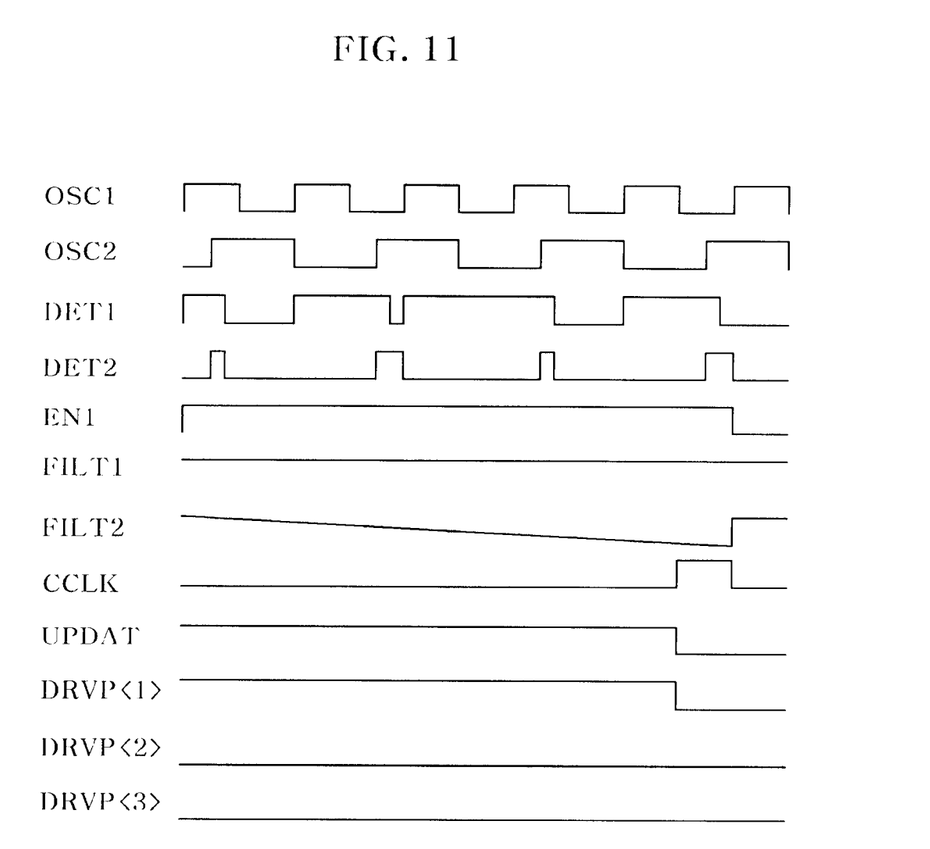
FIGS. 11 and 12 are timing diagrams illustrating the operation of an on-die termination circuit as shown in FIG. 3.

As shown in FIG. 11, when the period of the first period signal OSC2 is longer than the period of the reference period signal OSC1, the phase frequency detection block 131 generates the first control signal DET1 (i.e., longer high level duration than low level duration), and the second control signal DET2 (i.e., longer low level duration than high level duration).

When the enable signal EN1 is at a high level, the low pass filter block 132 generates the first filtering signal FILT1 at the high level in response to the second control signal DET2 having the longer low level duration than the high level duration. Simultaneously to this, the low pass filter block 132 generates the second filtering signal FILT2 changed from the high level to the low level in response to the first control signal DET1 in which the high level duration is longer than the low level duration.

When the first filtering signal FILT1 at the high level and the second filtering signal FILT2 at the low level, the update signal generation block 133 changes the update signal UPDAT to a low level and enables the control clock CCLK to a high level in response to the low level duration of the second filtering signal FILT2.

The count block 134 changes the first driving signal DRVP<1> to a low level in response to the low level of the update signal UPDAT in the section in which the control clock CCLK is enabled at the high level.

The driver circuit 14 drives the pad DQPAD2 in response to the first driving signal DRVP<1> at the low level, resulting in the increase in the level of the pad voltage VPAD2. As a result, the period of the first period signal OSC2 is reduced due to the pad voltage VPAD2 having the increased level.

Figure 12:
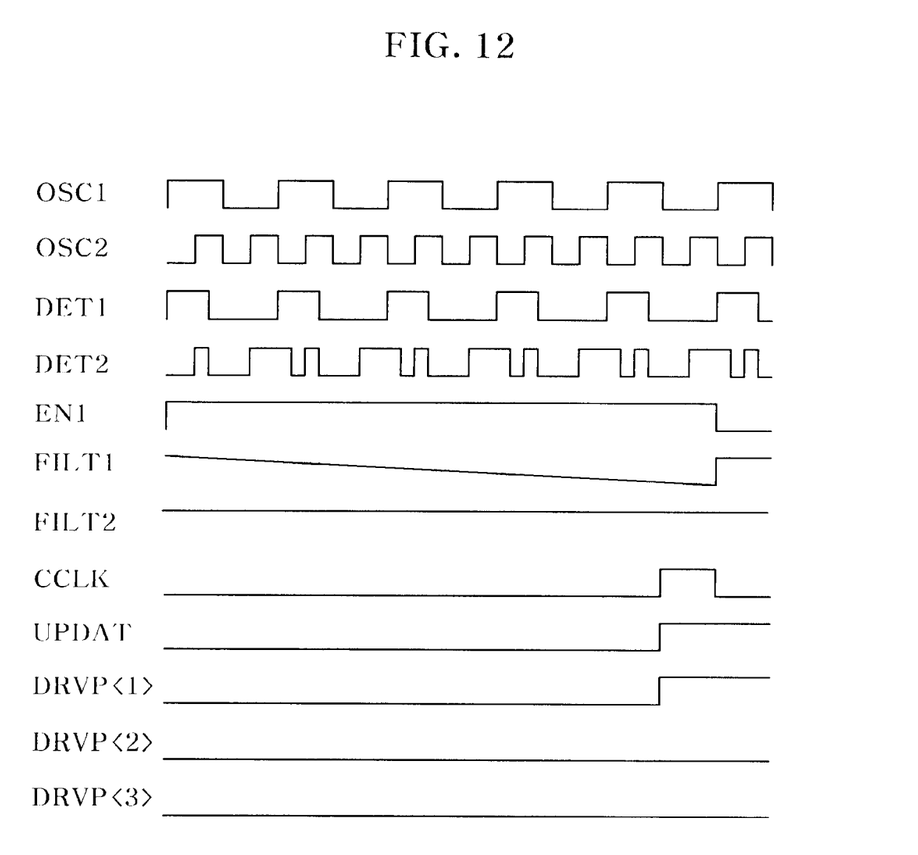

Next, as shown in FIG. 12, when the first period signal OSC2 has a period shorter than that of the reference period signal OSC1, the phase frequency detection block 131 generates the first control signal DET1 having the longer low level duration than the high level duration and the second control signal DET2 having the longer high level duration than the low level duration.

When the enable signal EN1 is at the high level, the low pass filter block 132 generates the second filtering signal FILT2 at the high level in response to the second control signal DET2 having the longer high level duration than the low level duration. Simultaneously to this, the low pass filter block 132 generates the first filtering signal FILT1 changed from the high level to the low level in response to the first control signal DET1 having the longer low level duration than the high level duration.

When the first filtering signal FILT1 at the low level and the second filtering signal FILT2 at the high level, the update signal generation block 133 changes the update signal UPDAT to a high level and enables the control clock CCLK to the high level in response to the low level duration of the first filtering signal FILT1.

The count block 134 changes the first driving signal DRVP<1> to a high level in response to the high level of the update signal UPDAT in the section in which the control clock CCLK is enabled at the high level.

The driving force of the driver circuit 14 driving the pad DQPAD2 in response to the first driving signal DRVP<1> at the high level is reduced, resulting in the reduction in the level of the pad voltage VPAD2.

As a result, the period of the first period signal OSC2 is increased due to the pad voltage VPAD2 having the reduced level.

After repeating the operations as shown in FIGS. 11-12, the on-die termination circuit fixes the levels of the driving signals DRVP<1:3> when the resistance value of the driver circuit 14 coincides with the resistance value of the external resistor R13, thereby completing the impedance matching operation.

The on-die termination circuit according to an embodiment of the present invention as described above (1) detects the period of the reference period signal OSC1 serving as a comparison reference and the period of the first period signal OSC2 having the period varying depending on the level of the pad voltage VPAD2 and (2) operates the driver circuit 14 according to the detection result, thereby allowing the internal resistance of the semiconductor memory device to be substantially equal to the external resistance. As such, the on-die termination circuit according to an embodiment of the present invention need not require a comparator, so that an abnormal operation of the on-die termination circuit due to an error of the comparator can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An on-die termination circuit comprising:
   a period comparison unit configured to compare a period of a first period signal with a period of a reference period signal and vary a count represented by a plurality of driving signals in response to the comparison; and
   a driver unit configured to drive a pad in response to the plurality of driving signals,
   wherein the first period signal has a first period according to a level of a reference voltage, and the first period signal has a second period according to a voltage level of a pad.

2. The on-die termination circuit of claim 1, wherein the period of the reference period signal is shortened when the level of the reference voltage is high and is lengthened when the level of the reference voltage is low.

3. The on-die termination circuit of claim 1, wherein the reference voltage is generated by resistors that distribute a pull-up voltage.

4. The on-die termination circuit of claim 1, wherein the period of the first period signal is shortened when the voltage level of the pad is high and is lengthened when the voltage level of the pad is low.

5. The on-die termination circuit of claim 1, wherein the period comparison unit comprises:
   a phase frequency detection unit configured to detect a period of the first period signal and a period of the reference period signal and generate a first control signal and a second control signal;
   a low pass filter unit configured to output a first filtering signal and a second filtering signal by low-pass filtering the first control signal and the second control signal;
   an update signal generation unit configured to generate a control clock and an update signal in response to the first filtering signal and the second filtering signal; and
   a count unit configured to output the update signal as the plurality of driving signals in synchronization with the control clock.

6. The on-die termination circuit of claim 5, wherein the phase frequency detection unit comprises:
   a reset signal generation unit configured to generate a reset signal in response to the first control signal and the second control signal;
   a first detection signal output unit configured to output a pull-up voltage as a first detection signal in synchronization with the reference period signal, and reset by the reset signal; and
   a second detection signal output unit configured to output the pull-up voltage as a second detection signal in synchronization with the first period signal, and reset by the reset signal.

7. The on-die termination circuit of claim 6, wherein the first detection signal output unit and the second detection signal output unit are reset when the first detection signal and the second detection signal are at a high level.

8. The on-die termination circuit of claim 5, wherein the low pass filter unit is configured to output the first filtering signal at a high level and the second filtering signal at a low level when a high level duration of the first detection signal is longer than a high level duration of the second detection signal.

9. The on-die termination circuit of claim 8, wherein the low pass filter unit is configured to output the first filtering signal at a low level and the second filtering signal at a high level when a high level duration of the second detection signal is longer than a high level duration of the first detection signal.

10. The on-die termination circuit of claim 5, wherein the low pass filter unit comprises:
a comparison unit configured to output the first filtering signal and the second filtering signal by comparing the first detection signal with the second detection signal;
a first inversion unit configured to output a pull-up enable signal by inverting an enable signal; and
a pull-up driver unit configured to pull-up drive a fifth node and a sixth node, through which the first filtering signal and the second filtering signal are output, in response to the pull-up enable signal.

11. The on-die termination circuit of claim 5, wherein the update signal detection unit is configured to generate the update signal at a low level when the first filtering signal is at a high level and the second filtering signal is at a low level.

12. The on-die termination circuit of claim 11, wherein the update signal detection unit is configured to generate the update signal at a high level when the first filtering signal is at a low level and the second filtering signal is at a high level.

13. The on-die termination circuit of claim 5, wherein the update signal detection 5 unit comprises:
an update signal output unit configured to output the update signal in response to the first filtering signal and the second filtering signal;
a pre-control clock generation unit configured to output a pre-control clock when levels of the first filtering signal and the second filtering signal are different from each other; and
a control clock generation unit configured to output a pull-up voltage as the control clock in synchronization with the pre-control clock.

14. The on-die termination circuit of claim 13, wherein the update signal output unit includes an NAND gate latch that receives the first filtering signal and the second filtering signal to output the update signal and a first latch output signal.

15. The on-die termination circuit of claim 14, wherein the pre-control clock generation unit comprises:
a transmission signal output section configured to enable and output a transmission signal when the levels of the first filtering signal and the second filtering signal are different from each other; and
a pre-control clock output section configured to output the pre-control clock in response to a level of the transmission signal, the update signal and the first latch output signal.

16. The on-die termination circuit of claim 15, wherein the transmission signal output section is configured to generate the transmission signal at a high level when the first filtering signal is at a high level and the second filtering signal is at a low level.

17. The on-die termination circuit of claim 16, wherein the transmission signal output section is configured to generate the transmission signal at a high level when the first filtering signal is at a low level and the second filtering signal is at a high level.

18. The on-die termination circuit of claim 15, wherein the transmission signal output section includes a first logic unit that outputs the transmission signal by performing an XOR operation on the first filtering signal and the second filtering signal.

19. The on-die termination circuit of claim 15, wherein the pre-control clock output section comprises:
a second logic unit configured to perform a NAND operation on the update signal and the first latch output signal; and
a third logic unit configured to output the pre-control clock by performing an AND operation on the transmission signal and output of the second logic unit.

20. The on-die termination circuit of claim 5, wherein the count unit is configured to up or down-count the plurality of driving signals according to a level of the update signal in an enable section of the control clock.

21. The on-die termination circuit of claim 5, wherein the count unit is configured to up-count the plurality of driving signals when the update signal is at a low level while down-counting the plurality of driving signals when the update signal is at a high level in an enable section of the control clock.

22. The on-die termination circuit of claim 1, wherein the driver unit is configured to pull-up drive the pad in response to the plurality of driving signals.

23. The on-die termination circuit of claim 1, further comprising an external resistor arranged between the pad and a pulldown voltage.

* * * * *